United States Patent [19]

Evans et al.

[11] 4,027,755

[45] June 7, 1977

[54] APPARATUS AND METHOD FOR REDUCING DRAG BETWEEN CLUTCH OR BRAKE COMPONENTS IMMERSED IN A LIQUID

[75] Inventors: Kenneth W. Evans, Fairport; Mason M. Howlett, Penfield; David H. Kirkpatrick, Rochester, all of N.Y.

[73] Assignee: The Gleason Works, Rochester, N.Y.

[22] Filed: Jan. 29, 1976

[21] Appl. No.: 653,332

Related U.S. Application Data

[63] Continuation of Ser. No. 339,785, March 9, 1973, abandoned.

[52] U.S. Cl. .................. 192/18 A; 192/113 B; 192/58 C; 188/264 E
[51] Int. Cl.² .................. F16D 13/72; F16D 67/04
[58] Field of Search .......... 192/113 B, 58 B, 58 C, 192/57, 18 A, 70.12; 188/264 E, 264 P

[56] References Cited

UNITED STATES PATENTS

| | | | |
|---|---|---|---|
| 2,803,764 | 8/1957 | Lundskow | 192/113 B |
| 2,821,437 | 1/1958 | Lesher | 188/264 E |
| 2,953,040 | 9/1960 | Christenson et al. | 192/113 B |
| 2,956,649 | 10/1960 | Kelley | 192/113 B |
| 2,982,378 | 5/1961 | Scott | 192/113 B |
| 3,202,253 | 8/1965 | Merritt et al. | 192/113 B |
| 3,592,304 | 7/1971 | Thompson | 192/113 B |
| 3,605,963 | 9/1971 | Roob et al. | 192/113 B |

*Primary Examiner*—Benjamin W. Wyche
*Attorney, Agent, or Firm*—Ralph E. Harper

[57] ABSTRACT

An apparatus and method for reducing drag forces between spaced components which are moving relative to each other while immersed in a liquid bath includes the introduction of a quantity of gas, such as air, into the liquid bath with a gas injecting means.

6 Claims, 1 Drawing Figure

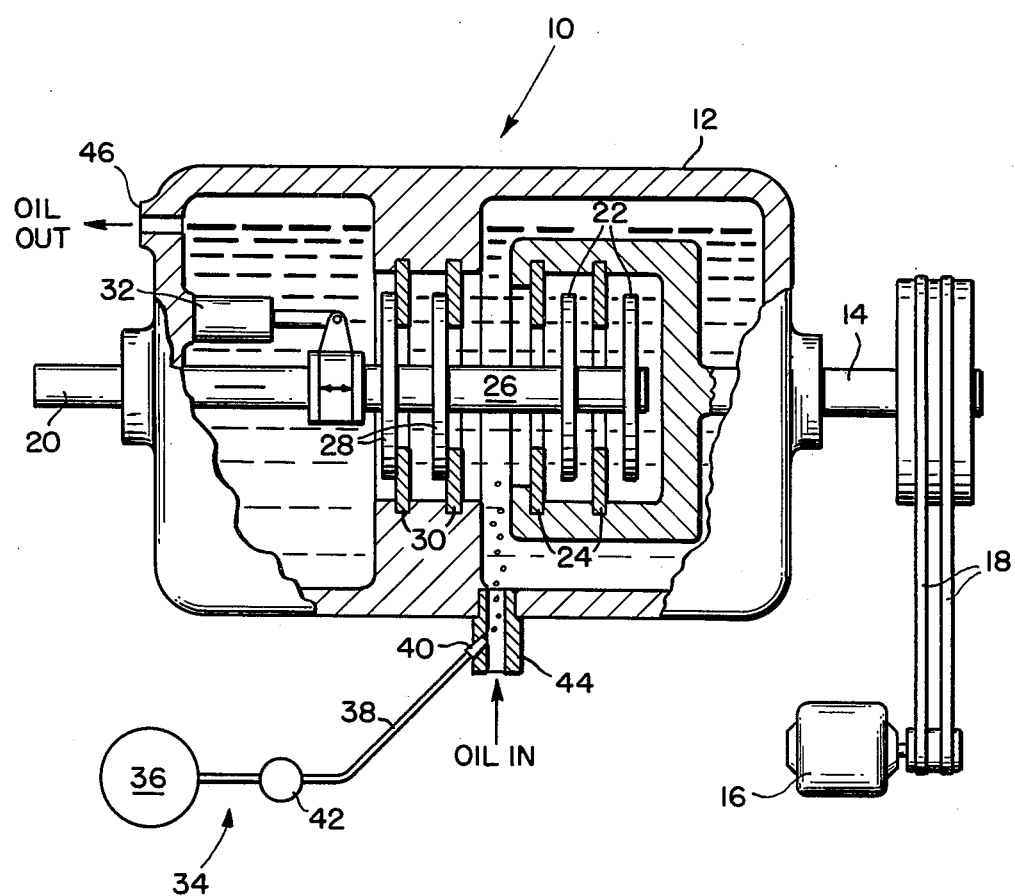

APPARATUS AND METHOD FOR REDUCING DRAG BETWEEN CLUTCH OR BRAKE COMPONENTS IMMERSED IN A LIQUID

RELATED APPLICATION

This application is a continuation application of the subject matter contained in our copending application Ser. No. 339,785, filed Mar. 9, 1973 and now abandoned.

BACKGROUND AND BRIEF DESCRIPTION OF INVENTION

The present invention is concerned with improvements in driving mechanisms of a type in which clutch and/or brake components are immersed in a liquid bath during operation so as to provide for a dissipation of frictional heat away from such components during successive cycles of engagement and disengagement. The specific improvement of the present invention is one of injecting a gas into the liquid bath of known mechanisms of the type just described so as to reduce drag stresses which develop between spaced components moving relative to one another in the liquid bath.

It is known in the art to provide for clutch, brake, or combination clutch/brake units which include disc and plate components that are brought into successive engagement and disengagement to change a driving characteristic of the unit. It is also known to submerse the working components of such units in a liquid bath for the primary purpose of heat from the areas of engagement between the disc and plate components. Known devices of the type just described are fully illustrated and discussed in U.S. Pat. Nos. 2,998,872; 3,614,999; and 3,680,666, and in other prior publications showing similar arrangements. Reference may be made to these patents for a more complete understanding of the prior art devices with which the present invention is concerned, and the specifications and drawings of the above-identified patents are incorporated herein by reference to the extent necessary to supply background information and understanding to the present specification.

It has been found in the operation of machinery with known mechanisms of the type discussed above that a measureable and significant amount of drag develops between adjacent discs and plates when they are out of contact with each other but moving relative to one another in the liquid bath supplied for cooling them. In fact, it has been found, in certain applications of such mechanisms to forging presses, that the power required to overcome drag in the clutch/brake mechanism is many times that required to drive the machine itself, thus requiring the use of a considerably larger and more expensive drive motor than would otherwise be required to drive the machinery. This drag appears to develop as a result of shear stresses in the films of liquid as contained within the space established between moving components during the operation of mechanisms of this type, and it has been determined that the drag characteristic can account for a considerable consumption of power applied to the unit under consideration.

The present invention constitutes a relatively remarkable, but simple, discovery that the aforesaid drag problem can be alleviated, by as much as a factor of five, through a technique which involves the introduction of a quantity of gas, such as pressurized air, into the liquid bath in such a way that the air is entrained and contained within the body of liquid in the spaces which exist between working components of the unit.

Although it has not been determined exactly why the introduction of air into a liquid bath results in such a substantial reduction in drag, it is believed that the entrainment of air in the liquid bath substantially reduces the Kinematic viscosity of the oil medium so as to reduce its film shear stress, and that this is accomplished by "foaming" the liquid bath with the injected air. The foamed liquid retains nearly the same cooling properties for removing heat from the areas of engaging plates and discs in the device, and also, the foamed liquid functions as a lubricant for certain bearing surfaces contained within the device.

Thus, the apparatus of the present invention comprises a gas injecting means for introducing a quantity of a gas into a liquid bath to thereby reduce drag between components of a driving mechanism which are brought successively into and out of engagement with each other to change a driving characteristic of the mechanism.

The method of the present invention comprises, in its simplest form, the step of introducing a quantity of gas into a liquid contained within a clutch or brake unit, or combination thereof, of the type aforesaid.

These and other features and advantages of the present invention will be more completely understood in the detailed discussion which follows. In that discussion reference will be made to the accompanying drawing as briefly described below.

BRIEF DESCRIPTION OF DRAWING

The drawing illustrates, in schematic and diagrammatic form, a section through a mechanism of the type contemplated herein, showing a gas injecting means affixed thereto for applying the present invention to the known mechanism.

DETAILED DESCRIPTION OF INVENTION

Referring to the drawing, a driving mechanism 10 is illustrated as including a housing structure 12 within which certain working components are mounted and contained for changing a driving characteristic of the mechanism. The basic mechanism includes an input shaft 14 which receives a driving force from a motor 16 through one or more drive belts or chains 18. An output shaft 20 receives a driving moment from the input shaft 14 in accordance with the operation of working components carried between the input shaft 14 and output shaft 20.

The illustrated embodiment provides for clutching components made up of clutch discs 22 and annular clutch plates 24 carried on a shaft section 26 which is keyed to rotate the output shaft 20. It can be seen that when the shaft section 26 is moved axially toward the left relative to the axially fixed position of the output shaft 20, the clutch discs 22 will be brought into engagement with the clutch plates 24. With the clutch components in such engagement, any driving moment applied to the input shaft 14 will be transmitted to the output shaft 20.

The illustrated mechanism also includes braking components made up of brake discs 28 and annular brake plates 30, the latter being supported by the housing structure 12 in a fixed (non-rotating) attitude relative to the brake discs. When the clutching components are disengaged (by a movement of the shaft section 26 toward the right to the position shown in the drawing), the braking components are brought into frictional engagement with each other. This applies a braking force to the output shaft 20 so as to retard or stop its inertial rotation resulting from a previous engagement with the input shaft 14. Axial movements of the shaft section 26 can be carried out with a two-way hydraulic piston and cylinder combination 32 or with any other known means, including a combination of springs and fluid actuators.

The above description offers a relatively simple explanation of the basic relationship shown in the drawing, and a more detailed discussion and explanation of a unit of this type can be understood by reference to the previously identified U.S. Pat. No. 2,998,872.

In mechanisms of the type just discussed, it is known to fill the housing 12 with a liquid, such as an oil, for cooling the working components of the clutching and/or braking assemblies during normal operation which includes successive engagement and disengagement of such components. However, it has been discovered that a measureable drag is established between closely spaced components when they are out of actual engagement with each other when an oil bath of this type is utilized, and this drag is of a sufficient magnitude to typically require a substantial increase in input horsepower.

In accordance with the present invention, the drag which results from shearing forces developed in an oil bath between closely spaced members moving relative to one another is substantially reduced by introducing a quantity of compressed gas, such as air, into the liquid bath contained within the housing 12. The drawing illustrates a gas injecting means 34 which includes a a source of pressurized gas 36 which delivers gas through a conduit 38 to a nozzle 40. The nozzle 40 penetrates a part of the housing 12 so as to introduce the gas below the surface level of any liquid contained within the housing 12. A known valving and regulating means 42 may be provided for controlling the rate and pressure of delivery of gas into the liquid bath of the mechanism. In the illustrated embodiment, the gas is actually introduced into an oil delivery conduit 44 which circulates oil into the housing from a circuit (not shown) which receives oil for cooling from an outlet conduit 46. This arrangement ensures good mixing of the gas with the oil.

An example of an application of the present invention to a known combination of a clutch and brake in a single unit included the following structures and characteristics:

The clutch and brake unit was of a type described in U.S. Pat. No. 3,614,999 in which separate clutch and brake components function to change driving characteristics of a single drive shaft carried through the unit. The clutch/brake unit was installed on an eccentric throw forming press which required cyclical engagement and disengagement (accompanied by braking of the press eccentric) of a drive motor connected to the clutch/brake unit. It was noted in initial trials of such a unit that about 150 horsepower was consumed under idling torque conditions at 800 rpm. This drag torque was calculated to be about 11,810 lb. per inch or about 3.24 percent of the peak torque rating of the clutch. This meant that a 200 horsepower motor would have been required to supply sufficient energy to overcome the drag of the clutch/brake unit and to operate the forming press to which the unit was attached. However, it was found that the addition of air to the bath of the clutch/brake unit reduced the drag horsepower down to about 30 horsepower (a five-to-one reduction in horsepower), thereby reducing the drag torque to about 0.65 percent of the peak torque rating of the clutch. This permitted the use of a much lower horsepower motor for driving the forming press through the clutch/brake unit. In addition, the drag speed of the motor was increased.

The air injecting means for the above-described example included a source of compressed air, a metering nozzle, a flow measuring device, and a logic circuit to switch the amount of air introduced from one value to another to accommodate various types of frequent or infrequent clutching cycles. It has been found that satisfactory results are obtained when about three cubic feet of air per hour are mixed continually with a twelve gallon per minute flow of oil for clutch idle and normal operating (clutch actuated every 8–10 seconds) conditions. Under such conditions a 60 horsepower motor proved to be adequate for overcoming a 40 horsepower drag torque (calculated for continuous idle) of the clutch/brake unit and for operating the forming press.

It will be appreciated that the principles of the present invention can be applied to other mechanisms, such as clutching means for power transmission devices, where it is desired to reduce drag between moving surfaces operating in a liquid medium. All such modifications and changes as would be obvious to a person skilled in this art, in view of the present teachings, are intended to be included in the scope of protection defined in the claims which follow.

What is claimed is:

1. In a driving mechanism of a type that includes (a) components which can be brought successively into and out of engagement with each other to effect a change in driving characteristic of said mechanism and (b) a liquid bath into which said components are continuously immersed sufficiently to provide a heat transfer liquid for cooling the components during operation of the mechanism, the improvement comprising
   gas injecting means for introducing a quantity of a gas into said liquid bath to thereby reduce drag between said components and the liquid of said bath while said components are maintained in said immersed condition in said liquid bath at all times, and said gas injecting means being arranged to introduce said gas below the surface level of said liquid bath to thereby provide for a mixing of the gas with the liquid bath.

2. The improvement of claim 1 wherein said driving mechanism comprises a clutch unit in which said components include at least one clutch plate and at least one clutch disc which can be brought into and out of engagement with each other.

3. The improvement of claim 1 wherein said driving mechanism comprises a brake unit in which said components include at least one brake plate and one brake disc which can be brought into and out of engagement with each other.

4. The improvement of claim 1 wherein said driving mechanism comprises a clutch-brake unit of a type in which braking components and clutching components can be selectively and alternately actuated.

5. The improvement of claim 1 wherein said gas injecting means comprises means for delivering air from a pressurized supply to said liquid bath contained within said mechanism.

6. A method for reducing drag between a clutch plate and a clutch disc when said clutch plate and clutch disc are disengaged and moving relative to each other while substantially immersed in an oil bath, comprising the steps of introducing a quantity of gas below the surface level of said oil bath to thereby assure good mixing of the gas with the oil bath, and maintaining said clutch plate and said clutch disc in said substantially immersed condition while said quantity of gas is being introduced into the oil bath.

* * * * *